United States Patent
Himi et al.

(10) Patent No.: US 8,228,771 B2
(45) Date of Patent: Jul. 24, 2012

(54) OPTICAL DISC RECORDING APPARATUS AND OPTICAL DISC RECORDING METHOD (75) Inventors: Takuya Himi, Tokyo (JP); Toshiki Ishii, Yokohama (JP); Tsuyoshi Toda, Kodaira (JP)

(73) Assignees: Hitachi, Ltd., Tokyo (JP); Hitachi-LG Data Storage, Inc., Tokyo (JP)

( * ) Notice: Subject to any disclaimer, the term of this patent is extended or adjusted under 35 U.S.C. 154(b) by 1054 days.

(21) Appl. No.: 12/056,430

(22) Filed: Mar. 27, 2008

(65) Prior Publication Data

US 2008/0304388 A1 Dec. 11, 2008

(30) Foreign Application Priority Data

Jun. 7, 2007 (JP) ................................. 2007-151088

(51) Int. Cl.
*G11B 11/00* (2006.01)
(52) U.S. Cl. .................................................... 369/53.31
(58) Field of Classification Search ............... 369/53.31, 369/47.5, 47.53, 59.1, 53.1, 47.1, 59.11, 369/59.12, 94
See application file for complete search history.

(56) References Cited

U.S. PATENT DOCUMENTS

| 7,295,500 B2* | 11/2007 | Nakano et al. | 369/47.53 |
| 2005/0063274 A1* | 3/2005 | Nagano et al. | 369/59.11 |
| 2005/0147007 A1* | 7/2005 | Nakano et al. | 369/47.53 |
| 2005/0174906 A1* | 8/2005 | Narumi et al. | 369/47.53 |
| 2005/0249074 A1 | 11/2005 | Yanagawa | |
| 2006/0164940 A1* | 7/2006 | Imura et al. | 369/47.53 |

FOREIGN PATENT DOCUMENTS

JP 2005-228410 8/2005
WO WO 2005/008645 A1 1/2005

* cited by examiner

*Primary Examiner* — Joseph Feild
*Assistant Examiner* — Nicholas Lee
(74) *Attorney, Agent, or Firm* — Antonelli, Terry, Stout & Kraus, LLP.

(57) ABSTRACT

In a recording/reproducing apparatus and a recording method, for enabling a high reliability on reproduction data are conducted the followings: recording a test mark within the test aria with a predetermined write strategy; obtaining signal amplitudes corresponding to a front portion, a middle portion, and a rear portion of the test mark, by reproducing the test mark; determining on whether the test mark has a desirable configuration or not, upon basis of at least one of ratios, defined between the amplitude of the front portion and the amplitude of the rear portion, and between the amplitude of the middle portion and the amplitude of the rear portion; correcting the write strategy if it is determined that the test mark has not the desirable configuration; and recording the information within the data area with the write strategy after the correction thereof.

8 Claims, 8 Drawing Sheets

OPTICAL DISC RECORDING APPARATUS AND OPTICAL DISC RECORDING METHOD

BACKGROUND OF THE INVENTION

The present invention relates to an optical disc recording/reproducing apparatus for conducting record of information on an information recording medium, and it relates to a technology for controlling the recording by means of a laser light or beam, appropriately.

As technologies relation to the present invention are already known the following Patent Documents 1 and 2.

In the Patent Document 1 is disclosed an information recording apparatus comprising a recording means for recording information to be recorded (hereinafter, being called "record information") on an information recording medium, being already recorded pre-information therein for controlling the recording of the record information, by irradiating a laser beam while changing a laser power upon basis of a driving pulse, a first control means for changing the driving pulse, at least, between a top pulse (Po) and a middle pulse (Pm), an optimum ratio detect means for detecting an optimum ratio, e.g., a pulse ratio at which a first reproducing quality satisfies a first criterion predetermined, at least upon basis of a first correlation information indicative of a correlative relationship between a pulse ratio (Po/Pm) of the top pulse and the middle pulse, and the first reproducing quality of the pre-information, and a second control means for changing the driving pulse into the pulse ratio depending upon the optimum ratio.

In the Patent Document 2 is disclosed, "a recording power changeable circuit brings a ratio to be constant, between a recording power Po, at a front end portion and a rear end portion of a power learning recording pattern, which is outputted from a recording pattern generating circuit, and a recording power Pm at a middle portion thereof, while the recording powers Po and Pm are set to be variable, and wherein the data for use of learning a recording power is recorded". Also, there is disclosed, "when reproducing the data for use of learning recording power, an allowable power range determining circuit determines an allowable range of the recording power, while setting the recording power to be an upper limit value, which is calculated by a power calculation circuit from a modulation factor detected from a signal reproduced and an allowable upper limit of the modulation factor, and setting the recording power to be a lower limit value, which is calculated from a volume of distortion of waveform detected from the reproduced signal and the recording power calculated by means of an allowable waveform distortion power determining circuit".

[Patent Document 1] Japanese Patent Laying-Open No. 2005-228410 (2005); and

[Patent Document 2] WO 2005-008645 (2005).

BRIEF SUMMARY OF THE INVENTION

However, optical discs of groups of DL (DOUBLE LAYER), such as, a DVD+R, and DL (DUAL LAYER), such as, a DVD-R, show a tendency that a mark configuration comes to be thin at a center thereof, when recording it. In particular, the longer the mark length, the thinner the mark at the center thereof, and therefore this sometimes gives an ill effect upon a sync code, including a 14T mark (or a space) therein.

Further, optical disc recording/reproducing apparatuses differ the reproducing performances or capacities thereof, due to existence of mechanical errors, depending on each of the apparatuses. When reproducing an optical disc, being recorded such the marks, being thinned at the center portion thereof, there can be considered a possibility that an effort is produced within the data, which is reproduced by the reproducing performances of the apparatus.

An object is, according to the present invention, to provide a recoding/reproducing apparatus and a recording method for achieving a high reliability of the reproduced data thereof.

According to the present invention, for accomplishing the object mentioned above, for example, an adjustment is made on a recording power when executing an OPC (Optimum Power Control) for obtaining the optimum recording power, and at the same time amplitudes are measured at a plural number of portions of that recording mark, from a reproduced waveform of the recording mark longer than a shortest one. As the plural number of portions of that recording mark may be used the amplitudes at a rear portion and at middle portion thereof. And, from a ratio of the amplitudes measured, determination is made upon the configuration of the recording mark. In case where the recording mark does not have the configuration desired, then the adjustment is made on the recording power so that the mark configuration comes into the desired one.

In case where the recording pulse is divided into three (3) stages, such as, a front pulse, a middle pulse, and a rear pulse, which is used for recording a long recording mark, an adjustment of recording power can be conducted by changing the ratio between Po and Pm, e.g., fixing the laser powers Po of the front pulse and the rear pulse of the recording pulse, but changing the laser power Pm of the middle pulse, for example. And also may be applied a method of changing a pulse width of the front pulse.

According to the present invention mentioned above, it is possible to increase a reliability of the data reproduced.

BRIEF DESCRIPTION OF THE SEVERAL VIEWS OF THE DRAWING

Those and other objects, features and advantages of the present invention will become more readily apparent from the following detailed description when taken in conjunction with the accompanying drawings wherein.

DESCRIPTION OF THE PREFERRED EMBODIMENTS

Hereinafter, embodiments according to the present invention will be explained in details thereof, by referring to the attached drawings; however, the present invention should not be restricted to the embodiments, which will be mentioned below.

Figure 1:
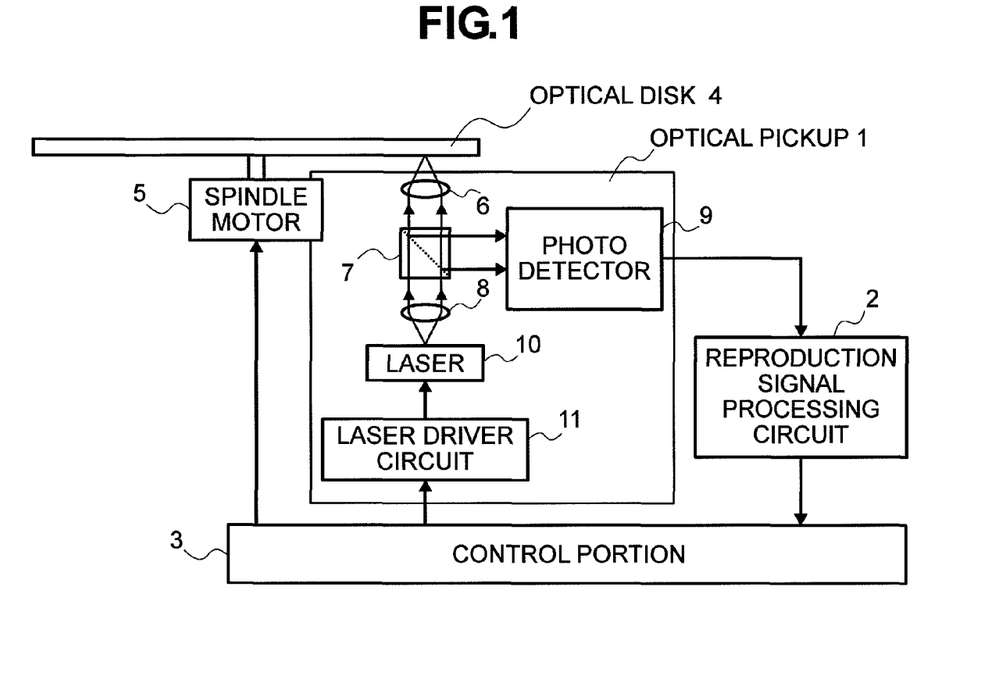
FIG. 1 is a block diagram for explaining the structures of an optical disc recording/reproducing apparatus, according to an embodiment of the present invention.

First of all, explanation will be made on the structures of an optical disc recording/reproducing apparatus, according to the present invention. FIG. 1 is a block diagram for showing the structures of the optical disc recording/reproducing apparatus. The optical disc recording/reproducing apparatus has an optical pickup 1, a reproduction signal processing circuit 2, a controller portion 3, and a spindle motor 5.

The optical pickup 1 has an objective lens 6, a prism 7, a collimator lens 8, a photo detector 9, a semiconductor later 10 and a laser driver circuit 11. The optical pickup 1 is able to detect a laser beam reflected upon an optical disc 4, while irradiating the laser beam upon the optical disc 4. According to the present embodiment, the semiconductor laser 10 is a semiconductor laser for use of DVD, having a wavelength of about 650 nm. However, not being limited to this, there may be applied a semiconductor laser having a wavelength of about 405 nm, in particular, when recording/reproducing a Blu-ray disc (hereinafter, being abbreviated "BD") as an optical disc.

The optical disc recording/reproducing apparatus shown in FIG. 1 is an example, wherein one (1) piece of the semiconductor laser is mounted thereon, but the present invention should not be limited to this; i.e., two (2) pieces of the semiconductor lasers may be mounted, such as, a semiconductor laser for user in recording/reproducing a DVD and a semiconductor laser for user in recording/reproducing BD, or further may be mounted a semiconductor laser for user of recording/reproducing a CD.

The reproduction signal processing circuit 2 produces signals from a signal, which is detected by the optical pickup 1, such as, a reproduction signal and a servo signal, etc. The controller portion 3 conducts a driving control of servo, and decoding and demodulation of record data, etc., upon basis of the signal processed within the reproduction signal processing circuit 2.

Explanation will be made on a recoding process of information within this optical disc recording/reproducing apparatus.

First of all, when information is inputted from a host computer into the controller portion 3, then that information data is demodulated within the controller portion 3, to be converted into a code train corresponding to a modulation method adapted. Further, the code trains demodulated is converted into a write strategy (i.e., a recording pulse train for controlling the length and width of a recording mark). The write strategy is set within the controller portion 3 in advance, and is changeable. An adjustment of the write strategy will be explained, later, in more details thereof.

Next, the strategy converted is inputted into the laser driver circuit 11. The semiconductor laser 10 is driven in accordance with the write strategy, and a laser beam is emitted from the semiconductor laser 10. The laser beam, after being converted into a parallel light within the collimator lens 8, passes through the prism 7, and further is condensed or focused on a recoding layer of the optical disc 4 by means of the objective lens 6. With this, a mark is formed on the recording layer of the optical disc, corresponding to the recording pulse train mentioned above, and thereby recording of data is conducted.

Next, explanation will be made on a reproducing process of information within this optical disc recording/reproducing apparatus.

The laser beam is irradiated from the semiconductor laser 5 of the optical pickup, and this laser beam is incident upon the optical disc 4. A reflection light from this optical disc 4 is divided or separated from, on an optical path thereof, to be incident upon the photo detector 9. Upon the light received by this photo detector 9 is conducted the photoelectric conversion, and is transmitted into the reproduction signal processing circuit 2.

The reproduction signal processing circuit 2 is built up with, such as, a waveform equalizer circuit, an automatic gain control circuit, a digitizer circuit, and a PLL (Phase Lock Loop) circuit, etc., for example. In the reproduction signal processing circuit 2 are produced a binary (or, digitized) signal and a reproduction clock synchronized with this binary signal, from an electric signal mentioned above (i.e., the reproduced signal) inputted. Also, within the reproduction signal processing circuit 2 is produced the servo signals, such as, a tracking error signal, a focus error signal, etc., for example. Those signals are transmitted into the controller portion 3, so as to decode the data. Further, but not shown in this FIG. 1, within the reproduction signal processing circuit 2 is also included a peak detector circuit and a bottom detector circuit, for detecting an amplitude of the reproduced signal.

Within the controller portion 3, upon basis of the information transmitted from the reproduction signal processing circuit 2 can be conducted the followings; i.e., determination on whether recording is good or not, and an optimization of the write strategy, etc.

Figure 2:
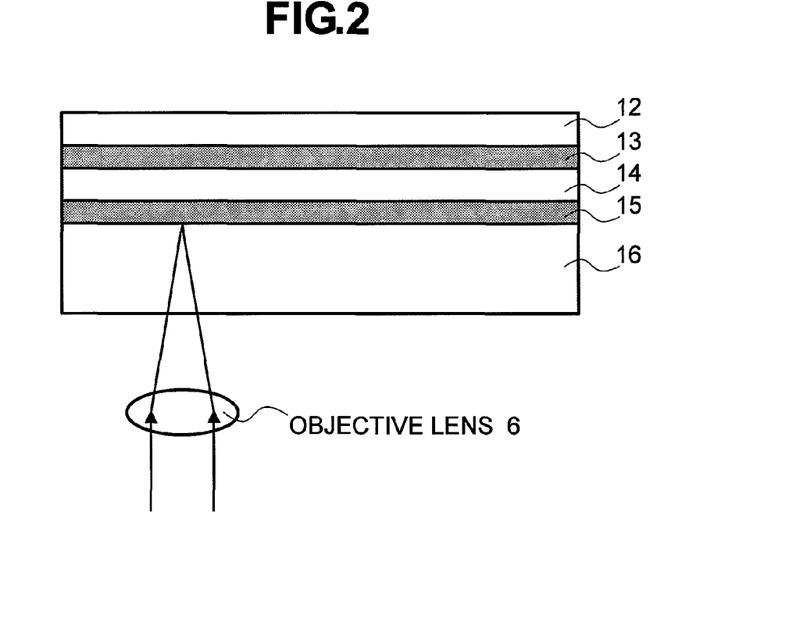
FIG. 2 is a view for showing an example of a recording medium having two (2) layers structure.

Herein, explanation will be made on the optical disc 4 having a multi-layers structure, to be recorded/reproduced with using the optical recording/reproducing apparatus, by referring to FIG. 2 attached herewith. The optical disc 4 is made up with a translucent protection layer 16, a first recoding layer 15 located to be close to an incident surface of the laser beam, a second recording layer 13 located to be far from the incident surface of the laser beam, a middle layer 14 provided between the first recording layer 15 and the second recording layer 13, and a protection layer 12. The laser beam incident upon the optical disc 4 passes through the translucent protection layer 16, and is condensed or focused on the first recording layer 15 or the second recording layer 15.

Figure 3:
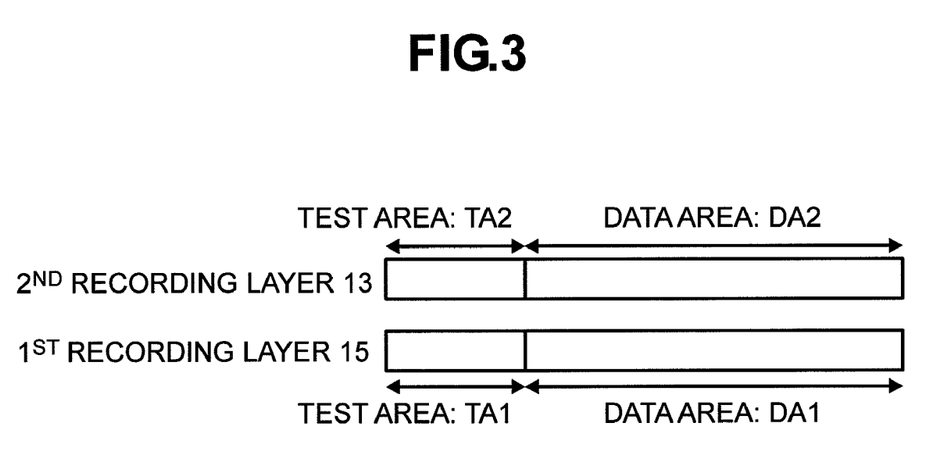
FIG. 3 is a view for showing an example of the structures of a data area and a test area on the recording medium having two (2) layers structure.

FIG. 3 is a view for showing the structures, diagrammatically, a recording area, for each of the recording layers of the optical disc 4 having the two (2)-layers structure. As is shown in this FIG. 3, within the first recording layer 15 are provided a data area DA1, i.e., an area for recording data therein, and a test area TA1, to be used for determining the recording condition when recording data into that data area DA1. Also, in the similar manner to the above, within the second recording layer are also disposed the data area DA2 and the test area TA2.

Next, explanation will be made on an OPC (Optimum Power Control) with using the test area, by referring to FIG. 4 attached herewith.

The OPC is executed when a record command is transmitted from a host computer, after the optical disc 4 is inserted into the optical disc recording/reproducing apparatus.

Figure 6:
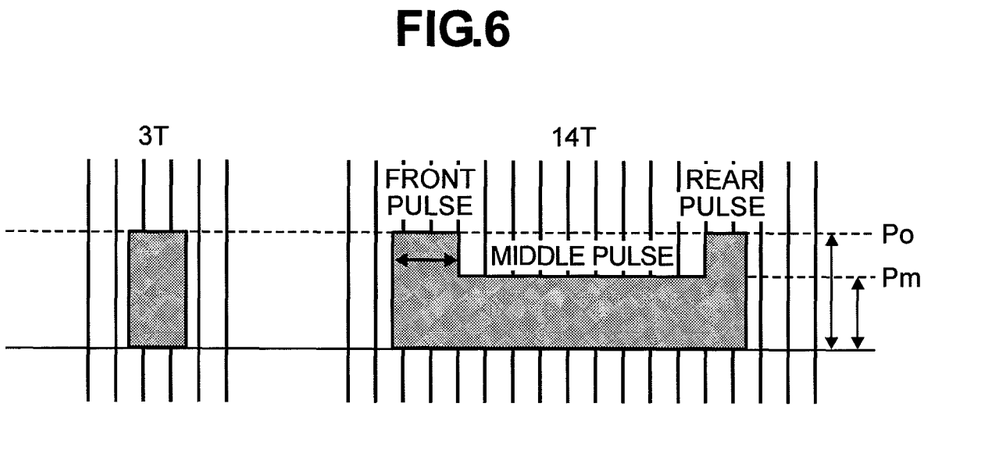
FIG. 6 is a view for explaining a write strategy of a castle type.

FIG. 6 attached herewith shows the structures of a write strategy for a castle type, according to the present embodiment. In this FIG. 6, the vertical axis indicates the recording power, while the horizontal axis timings of the recording pulses, wherein the write strategy is defined by the recording power and a pulse timing thereof. Herein, in the case of the castle type, the recording powers of both a front pulse and a rear pulse are the same power, and are called, "Po", and the recording power of a middle pulse lying between the front pulse and the rear pulse, "Pm", respectively. Also, a ratio Po/Pm between Po and Pm is called, a "PoPm ratio", and the pulse timing of the front pulse, "nTop", respectively. Further, in FIG. 6 are shown a 3T mark and 14T mark (herein, T is a channel bit), for example, but the recording power and the pulse timing are determined for each of 3T to 11T marks and 14T mark, which are defined in the DVD standard or regulation, respectively.

Those write strategy information are set into the laser driver circuit 11. As is shown in FIG. 4, when the OPC starts, a test pattern 1 is recorded, within at least one of the test area TA1 and the test area TA2, with changing the recording power while fixing the PoPm ratio mentioned above, or changing the pulse timing (S1).

Next, reproduction is made on the test pattern 1, which is recorded within the test area, and thereby conducting measurement upon the recording mark (S2). In this measurement are obtained the recording quality information, such as, a jitter, a beta, etc., of the test pattern recorded. Further, information is also obtained information of amplitude of a mark longer than a reproduced waveform of the test pattern recorded. Herein, the long mark means a recoding mark longer than the shortest mark. In case of the DVD, since the length of the shortest mark is 3T, then the recording marks equal or longer than 4T are included within that long marks. Also, in case of the BD, since the length of the shortest mark is 2T, then the recording marks equal or longer than 3T are included within that long marks, in the meaning according the present invention.

Figure 7:
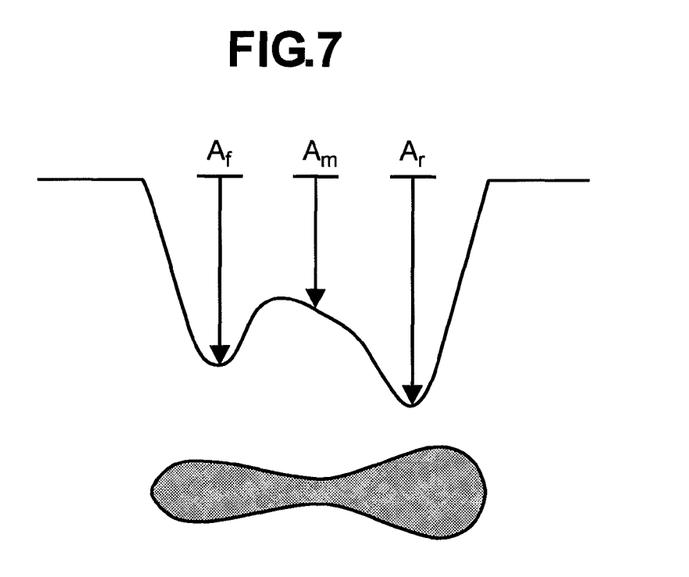
FIG. 7 is a view for explaining an example of the configuration of the long mark and a reproduced waveform thereof.

FIG. 7 shows a relationship, diagrammatically, between the configuration of the long mark, which is thinned at a front-end portion thereof, and the reproduced waveform when reproducing that long mark. Herein, on the reproduced waveform of the long mark, an amplitude at the front-end portion is called "Af", an amplitude in the middle portion "Am", and an amplitude at an rear-end portion "Ar", respectively. Also, among Af, Am and Ar, a ratio Am/Ar is called "Am/Ar ratio", and a ratio Af/Ar "Af/Ar ratio", respectively. Herein is shown examples of the Am/Ar ratio and the Af/Ar ratio, but other combinations thereof can be treated, in the similar manner to the above.

Also, herein, as a parameter is used the amplitude of the reproduced waveform, corresponding to the front-end portion of the long mark, but the present invention should not be restricted only to this, in the place thereof, it is also possible to use the amplitude in a portion lying between the front-end portion and the middle portion of the long mark, as far as it enables to determine on whether the configuration of the long mark is a desirable one or not. Also, the amplitude of the reproduced waveform, at the middle portion of the long mark, should not be restricted necessarily, only to the amplitude corresponding to the middle portion of the long mark, but in the place thereof, it is possible to use the amplitude at a position on a front-end side or a rear-end side from the center thereof. And also, in the similar manner, in the place of the amplitude corresponding to the rear-end portion of the long mark, it is possible to use the amplitude at the position nearer to the center than the rear-end portion of the long mark.

Next, estimation is made upon the recording quality, the amplitude information, etc., of the recording mark within the control portion 3. Herein, determination of a reference Po is made upon basis of the jitter of the 3T mark, e.g., a mono pulse (S3). Herein, though the explanation is made by assuming that an index for determining the reference is Po, but it may be determined by using an index other than that.

Next, determination is made on whether the mark configuration is desirable one or not, upon basis of the amplitude information of the long mark, i.e., Af, Am and Ar (S4) As a determining condition of the mark configuration can be set up a relationship between those indexes and an arbitrary threshold value, while using the AmAr ratio and the AfAr ratio as the indexes, for example. An ideal configuration of the mark is 1, both of the AmAr ratio and the AfAr ratio. For example, values for determination are set within a range, wherein a lower limit is 0.85 and an upper limit 1.15 in the AmAr ratio or the AfAr ratio. In case when the AmAr ratio or the AfAr ratio calculated is not within the range determined, then the determination is made "No". Therein, the range determined (i.e., the upper limit or the lower limit) is only an example; and therefore, it may be different from this, depending on an optical disc or a recoding apparatus. In case when the determination condition is satisfied in the determination of the mark configuration, then the OPC is ended.

Within the step S4 for determination the mark configuration, if the when the AmAr ratio or the AfAr ratio does not satisfy the condition to be a target, then a process S5 for correcting the write strategy will be conducted on the long mark. However, in the place of the threshold value for determination may be used a predetermined range, as a reference for determination. Thus, it is also possible to conduct the determination, if the AmAr ratio or the AfAr ratio included within the predetermined range or not.

Also, though the AmAr ratio and the AfAr ratio are used as the indexes of the determination condition herein, but the similar treatment can be made upon other combinations of the amplitude information. Determination upon the mark configuration may be executed on all of the long marks other than the shortest mark, or the determining process may be executed with restriction on the length of the mark, for example, it is executed only on the marks equal or longer than 6T, etc.

Explanation will be made on the correction process S5, by referring to FIG. 5 attached herewith.

First of all, in the correction process S5, a correction S6 is conducted for the recording power Pm of the middle pulse, while fixing the reference Po, which is determined in the step for determining Po. In the correction S6 for Pm, an amount or volume of correction for Pm is determined, in accordance with a correction coefficient, which is determined depending on difference from 1, i.e., the ideal ratio thereof, with using the AmAr ratio as the parameter. For example, in case when the AmAr ratio is smaller than 1, then a central portion of the mark can be thicken by increasing the recording power Pm. Also, in case when the AmAr ratio is larger than 1, then the central portion of the mark can be thinned, by decreasing the recording power Pm.

Further, a correction S7 is conducted on the pulse width nTop of the front-end pulse, with using the AfAr ratio as the index. In the correction S7 for nTop, an amount or volume of correction for nTop is determined, in accordance with a correction coefficient, which is determined with the AfAr ratio and the difference from 1, i.e., the ideal ratio thereof. For example, in case when the AfAr ratio is smaller than 1, then the front-end portion of the mark is thicken by increasing the width of nTop. Or, in case when the AfAr ratio is larger than 1, then the front-end portion of the mark is thinned, by decreasing the width of nTop.

In the correction of the pulse width, there can be applied a method of changing a position where the pulse rises up while fixing a position where it falls down, or a method, on the contrary thereto, changing the position where the pulse falls down while fixing the position where it rises up. Further, it is also possible to change both of them, i.e., the position where the pulse rises up, and the position where it falls down.

Next, the write strategy information, such as, the reference Po determined in the step S3, Pm corrected in the step S6, nTop corrected in the step S7, etc., are set into the laser driver circuit 3, again, and the test pattern 2 is recorded at least one of the test area TA1 and the test area TA2, while fixing the PoPm ratio and the nTop, which are mentioned above (S8). The test pattern 2 may be same to the test pattern mentioned above, or different from that. As such the test pattern may be shown a test pattern constructed with only the long marks, which are determined not to be the desirable one in the step S4 for determining the mark configuration, but according to the present invention, it should not be only to this.

Next, upon the test pattern recorded are conducted the reproduction and the measurement thereof (S9). In this reproduction/measurement step S9 are conducted, similar to the reproduction/measurement step S2 shown in FIG. 4, i.e., obtaining the recording quality information, such as, the jitter and the beta, etc., of the test pattern recorded, and also obtaining the amplitude information.

Figure 4:
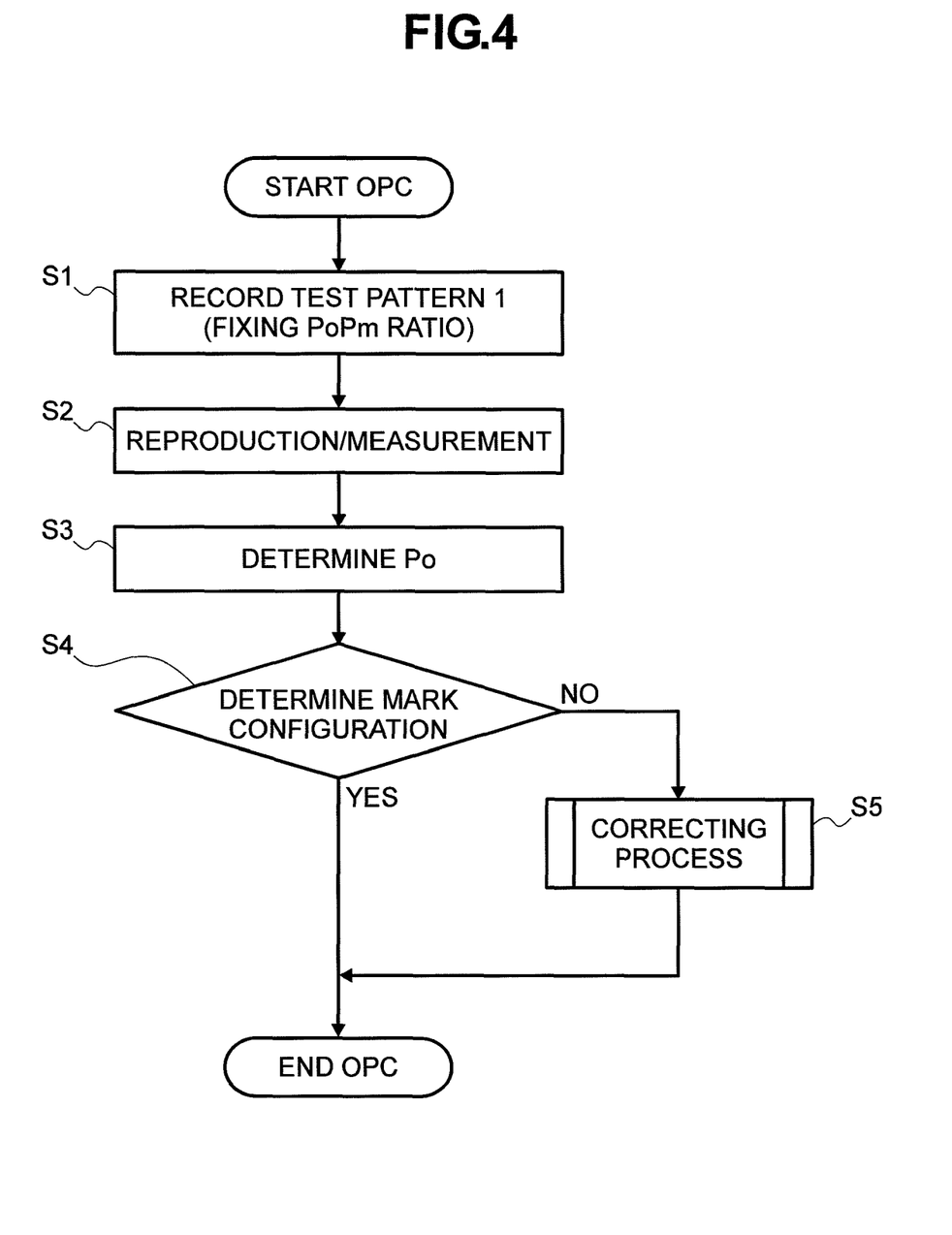
FIG. 4 is a flowchart for explaining an embodiment, according to the present invention.

In a determining step S10 to be conducted next, an arbitrary value is set up to be the threshold value for determination, with using the AmAr ratio and the AfAr ratio, similar to that in the determination S7 for mark configuration shown in FIG. 4. In case where the AmAr ratio and the AfAr ratio satisfy the conditions to be the target, in the determination S10, then the process for correcting the long mark is ended, and further the OPC is ended.

On the other hand, in case where the AmAr ratio and the AfAr ratio do not satisfy the conditions to be the target, in the determination S10, then the Pm correction S6 and the nTop correction S7 are conducted, again.

The OPC is ended, in this manner, and when the optimum write strategy is set up, then user data is recorded within the data area of the optical disc, upon basis of that write strategy. Since the write strategy is determined in accordance with the method mentioned above, it is possible to record the long mark while keeping the thickness thereof equal. For this reason, the long mark can be reproduced, with high accuracy.

Figure 8:
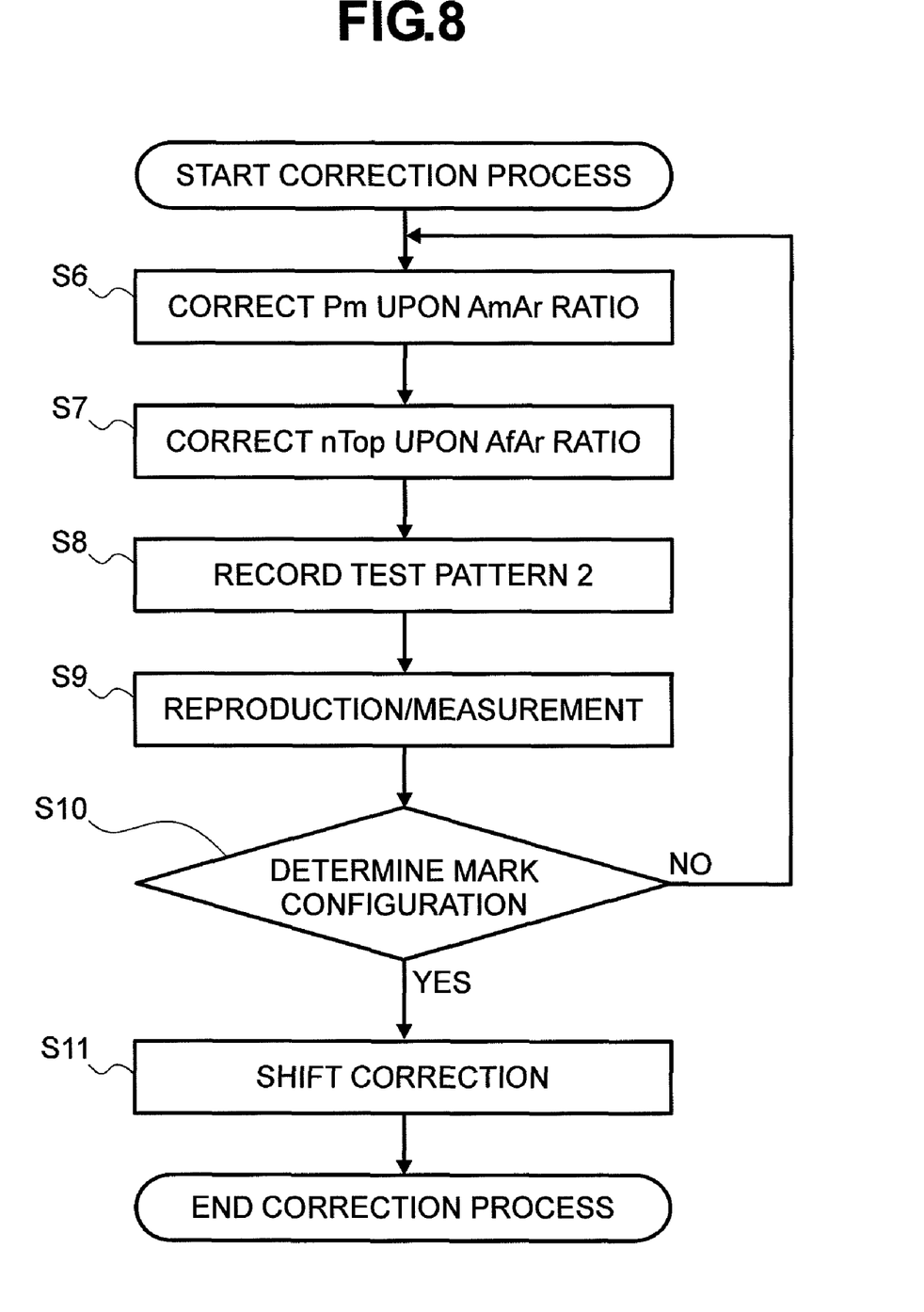
FIG. 8 is a flowchart for explaining other embodiment, according to the present invention.

In the OPC shown in FIG. 4, further a shift adjustment S11 can be made, as is shown by the flowchart in FIG. 8, but after conducting the step S10 for determining the mark configuration. In the shift adjustment S11, an adjustment is made on the pulse timing of the write strategy, which is determined in the Pm correction S6 and the nTop correction S7. With this, it is possible to achieve an optimization of the recording quality.

Figure 9:
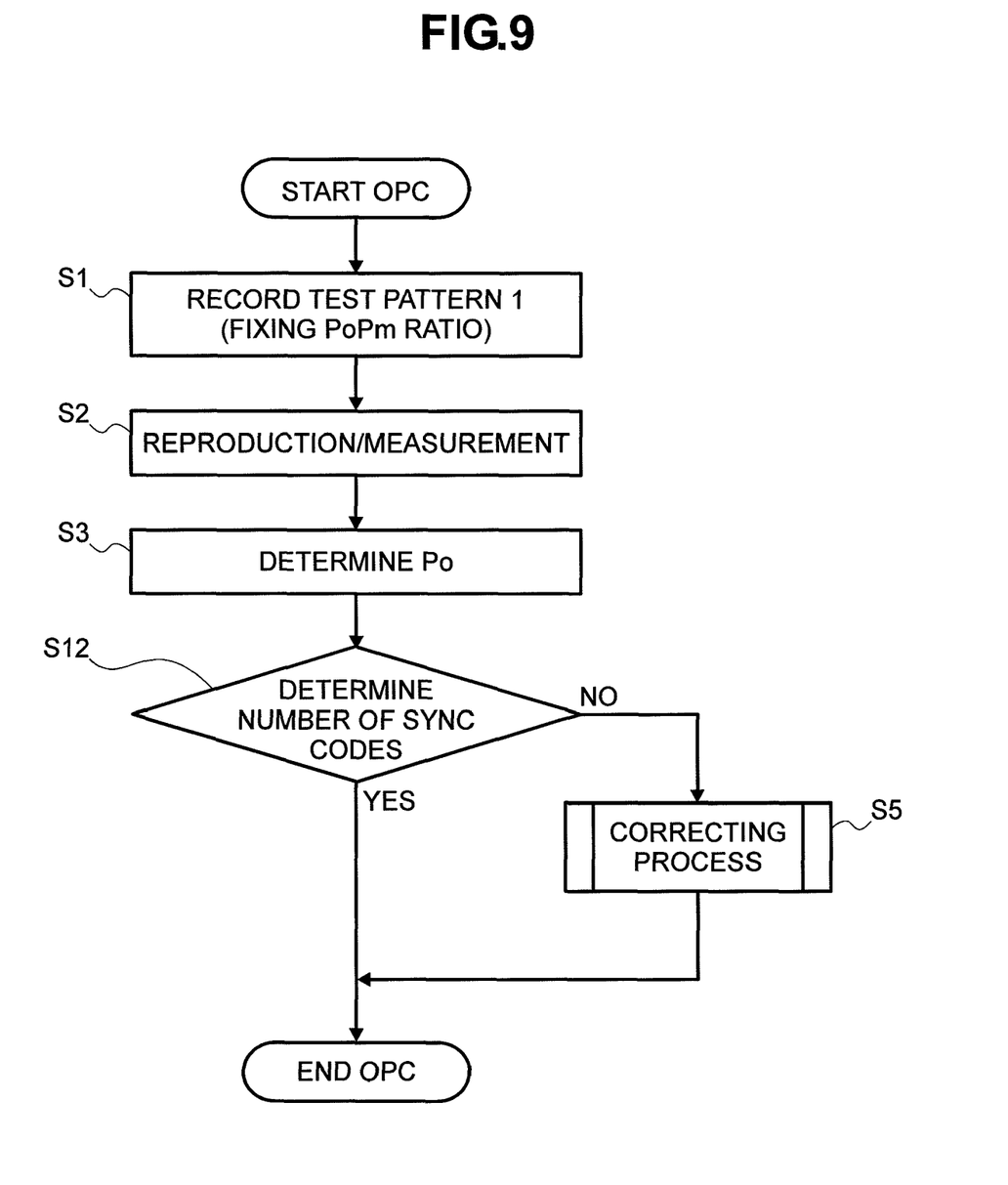
FIG. 9 is a flowchart for explaining other embodiment, according to the present invention.

An example of other embodiment, according to the present invention, will be shown in FIG. 9 attached herewith. This FIG. 9 shows a flowchart of the OPC, and in this OPC, determination is made on the configuration of the long mark, by determining a number of sync codes. Thus, in the OPC shown in FIG. 9, in the reproduction/measurement step S2, the number of pieces, for example, of the marks or the spaces, or both the marks and the spaces. And, in the place of the step S4 for determining the mark configuration shown in FIG. 4, determination is conducted upon the number of the sync codes. In this FIG. 9, the recording step S1 of the test pattern 1 and the step S3 for determining Po are basically same to those shown in FIG. 4, and therefore the explanation thereof is omitted herewith.

In accordance with the DVD regulation or standard, one (1) piece of the sync code (i.e., a 14T mark and a 14T space) lies for every 93 bites. Accordingly, the sync code existing within an arbitrary range where data obtaining is made is selected to be the threshold value. Thus, a case of inappropriate number of pieces of the sync codes is the case where the configuration of the 14T mark is inappropriate or improper, so that it cannot be reproduced, correctly, and in this embodiment, it is utilized for determining the configuration of the long mark.

Figure 5:
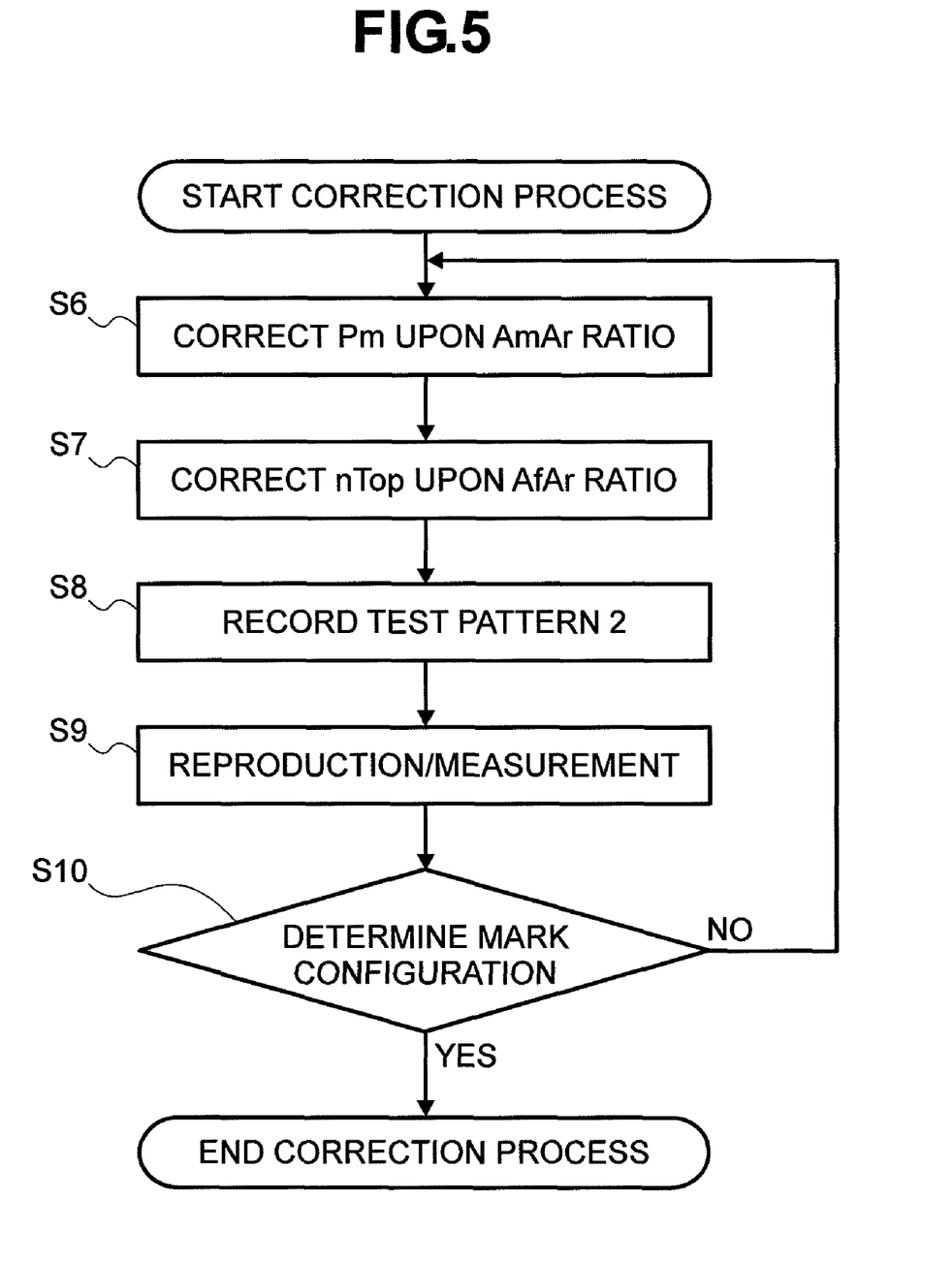
FIG. 5 is a flowchart for explaining an example of processing for correcting a long mark.
Figure 10:
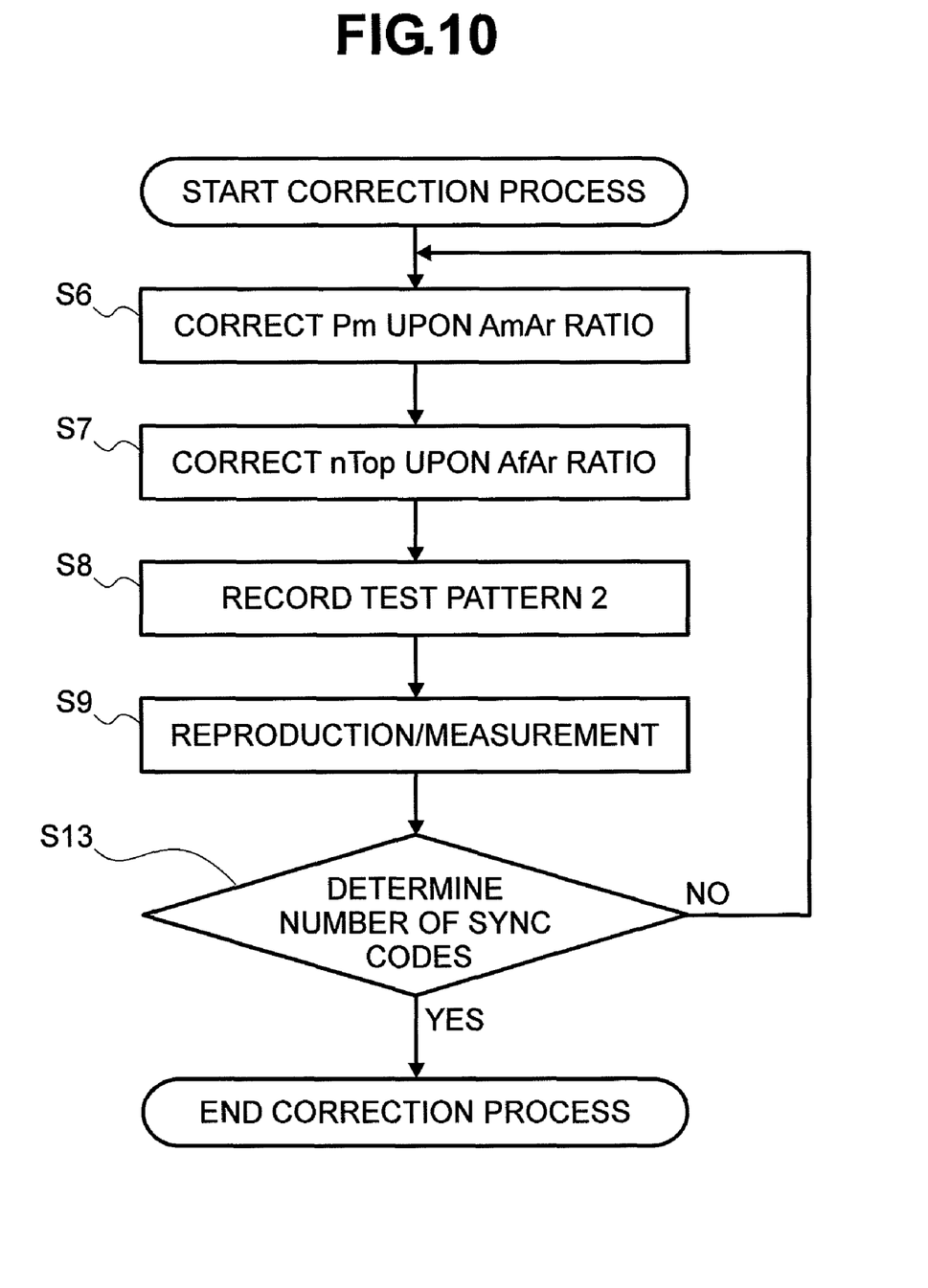
FIG. 10 is a flowchart for explaining other embodiment, according to the present invention.

FIG. 10 shows a flowchart for executing the determination of the sync number, in the place of the mark configuration determination S10, in the flowchart of the correction process shown in FIG. 5. The steps other than the determination of the sync number are basically same to those shown in FIG. 5, and therefore the explanation thereabout is omitted herein.

In the embodiment mentioned above, though it is explained that the step for determining the mark configuration and the step for determining the number of the sync codes are provided, separately, but according to the present invention, both those steps may be executed by only one (1) OPC process.

Also, in the embodiment mentioned above, though the explanation was given on the example of the optical disc of multi-layer structure, in particular, the optical disc having two (2) recording layers, but according the present invention, the process for correcting the long mark can be applied in the OPC, in case when it applies the write strategy of castle type, even if the optical disc having the multi-layers structure exceeding the two-layers structure or a single layer structure.

In the embodiment mentioned above, though the pulse width of the front pulse and the laser power of the middle pulse are applied as the parameters for adjusting the thickness of the recording mark, however the present invention should not be restricted only to this, but any other parameter can be applied if it enables to adjust the thickness of the recording pulse. For example, it is possible to adjust the amplitude of the front pulse. The adjustment may be made on the amplitude within a part of the middle pulse, but not adjusting the amplitude of the entire of the middle pulse.

Also, it is possible to divide the front pulse, the middle pulse or the rear pulse into a plural number of pulses (i.e., multiple pulses).

While we have shown and described several embodiments in accordance with our invention, it should be understood that disclosed embodiments are susceptible of changes and modifications without departing from the scope of the invention. Therefore, we do not intend to be bound by the details shown and described herein but intend to cover all such changes and modifications that fall within the ambit of the appended claims.

What is claimed is:

1. A recording method for recording information onto an optical disc having a data area and a test area, comprising the following steps of:

a test recording step for recording a test mark within said test area with a predetermined write strategy;

an obtaining step for obtaining signal amplitudes of a front portion, a middle portion, and a rear portion of said test mark, by reproducing said test mark;

a determining step for determining whether or not said test mark has a desirable configuration, upon basis of at least one of: a ratio defined between the amplitude of said front portion and the amplitude of said rear portion, and a ratio defined between the amplitude of said middle portion and the amplitude of said rear portion;

a correcting step for correcting said write strategy if the determining step determines that said test mark does not have a desirable configuration; and a recording step for recording the information within said data area with the corrected write strategy;

wherein a recording waveform to be used in recording of said test mark includes a front pulse, a middle pulse, and a rear pulse; and wherein said correcting step includes:

a step for changing only an amplitude of said middle pulse upon basis of a ratio between the amplitude of said middle pulse and the amplitude of said rear pulse, when said test mark does not have a desirable mark configuration;

a step for recording a test mark same to said test mark within said test area, with the use of said recording waveform, such that only the amplitude of said middle pulse is changed; and a step for determining whether or not the mark configuration has the predetermined mark configuration, by reproducing said test mark.

2. A recording method for recording information onto an optical disc having a data area and a test area, comprising the following steps of:

a test recording step for recording a test mark within said test area with a predetermined write strategy;

an obtaining step for obtaining signal amplitudes of a front portion, a middle portion, and a rear portion of said test mark, by reproducing said test mark;

a determining step for determining whether or not said test mark has a desirable configuration, upon basis of at least one of: a ratio defined between an amplitude of said front portion and an amplitude of said rear portion, and a ratio defined between an amplitude of said middle portion and an amplitude of said rear portion;

a correcting step for correcting said write strategy if the determining step determines that said test mark does not have a desirable configuration; and a recording step for recording the information within said data area with the corrected write strategy;

wherein a recording waveform to be used in recording of said test mark includes a front pulse, a middle pulse, and a rear pulse; and wherein said correcting step includes:

a step for changing only a width of said front pulse upon basis of a ratio between the amplitude of said front pulse and the amplitude of said rear pulse, when said test mark does not have a desirable mark configuration;

a step for recording a test mark same to said test mark within said test area, with the use of said recording waveform, such that only the pulse width of said front pulse is changed; and a step for determining whether or not the mark configuration has the desirable mark configuration, by reproducing said test mark.

3. An optical disc recording method for recording information onto an optical disc, with the use of recording pulses, upon forming a second recording mark longer than a first recording mark having a predetermined length, being construed with a front pulse of a front portion of said second recording mark, a middle pulse of a middle portion of said second recording mark and having an amplitude smaller than that of said front pulse, and a rear pulse of a rear portion of said second recording mark and having an amplitude larger than that of said middle pulse, comprising the following steps of:

a step for recording a test pattern, including said first recording mark and said second recording mark, within a test area of said optical disc;

a step for determining the amplitude of said rear pulse, upon basis of a reproduced signal of said first recording mark;

a step for determining whether or not a mark configuration has a desirable mark configuration, upon basis of the amplitude of the reproduced signal of said second recording mark, wherein the amplitude of the reproduced signal of the front portion of said second recording mark is Af, the amplitude of the reproduced signal of the middle portion thereof is Am, and the amplitude of the reproduced signal of the rear portion thereof is Ar, respectively, and wherein said step for determining whether or not a mark configuration has a desirable mark configuration is performed upon basis of at least one of the following ratios: (1) Af/Ar of the amplitude Af of the reproduced signal to the amplitude Ar of the reproduced signal, and (2) Am/Ar of the amplitude Am of the reproduced signal to the amplitude Ar of the reproduced signal; and a step for correcting said recording pulses when the mark configuration of said second recording mark does not have the desirable mark configuration, wherein said correcting step includes at least one of the following steps of:

a first step for correcting only the amplitude of said middle pulse upon basis of said ratio Am/Ar while fixing the amplitude of said rear pulse, a second step for correcting only the pulse width of said front pulse upon basis of said ratio Af/Ar while fixing the amplitude of said front pulse, and wherein said step for correcting said recording pulses further comprises the following steps of:

a step for recording a third recording mark, having the same mark length to said second recording mark, within said test area, by using the recording pulse, at least one of the amplitude of said middle pulse and the pulse width of said front pulse is corrected, and a step for determining whether the mark configuration has a desirable configuration by reproducing said third recording mark.

4. An optical disc recording method for an optical disc having a test area and a data area, comprising the following steps of:

a test recording step for recording a test mark within said test area with a predetermined strategy;

a step for calculating a first ratio between a reproduction signal amplitude Af in a front portion of said test mark and a reproduction signal amplitude Ar in a rear portion thereof, and a second ratio between a reproduction signal amplitude Am and said Ar, from the reproduced signal amplitudes of said test mark;

a determining step for determining whether or not said test mark has a desirable mark configuration, upon basis of at least one of said first ratio and said second ratio;

a correcting step for generating a corrected write strategy when said test mark does not have the desirable mark configuration; and a recording step for recording information within said data area with said corrected write strategy.

5. The optical disc recording method, as described in the claim 4, wherein said determining step determines that the configuration of said test mark has the desirable mark configuration when said first ratio or said second ratio is included within a predetermined preset range.

6. The optical disc recording method, as described in the claim 4, wherein a recording waveform to be used in recording of said test mark is constructed with a front pulse, a middle pulse, and a rear pulse; and wherein said correcting step corrects at least one of the amplitude of said middle pulse, the pulse width of said front pulse, and a timing of said front pulse.

7. An optical disc recording apparatus for recording information onto an optical disc having a data area and a test area, comprising:
- a laser light source configured to irradiate a laser beam upon a recording medium;
- a laser driver unit configured to drive said laser light source upon a predetermined write strategy;
- a photo detector unit configured to detect a reflection light from the recording medium, and to output a detection signal after photoelectric conversion thereof;
- a reproduction signal processing unit configured to process the detection signal from said photo detector unit; and
- a controller unit configured to control said laser driver unit and said reproduction signal processing unit, wherein said controller unit, when reproducing a test mark recorded within said test area with said write strategy, obtains amplitudes at a front portion, a middle portion and a rear portion of said test mark, and determines whether or not the reproduced test mark has a desirable mark configuration, upon basis of at least one of the following ratios: (1) a ratio between the amplitude of said front portion and the amplitude of said rear portion and (2) a ratio between the amplitude of said middle portion and the amplitude of said rear portion, and when said test mark does not have the desirable make configuration, said controller unit generates a corrected write strategy, whereby recording the information in said data area with said corrected write strategy;
- wherein a recording waveform to be used in recording of said test mark includes a front pulse, a middle pulse, and a rear pulse; and
- wherein said controller unit is configured to perform the following steps:
- changing only an amplitude of said middle pulse upon basis of a ratio between the amplitude of said middle pulse and the amplitude of said rear pulse, when said test mark does not have a desirable mark configuration,
- controlling to reproduce said test mark, after recording a test mark same to said test mark within said test area, with the use of the write strategy, such that only the amplitude of said middle pulse of which is changed; and
- determining whether or not the mark configuration has the predetermined mark configuration, from the reproduction signal of said test mark.

8. An optical disc recording apparatus for recording information onto an optical disc having a data area and a test area, comprising:
- a laser light source configured to irradiate a laser beam upon a recording medium;
- a laser driver unit configured to drive said laser light source upon a predetermined write strategy;
- a photo detector unit configured to detect a reflection light from the recording medium, and to output a detection signal after photoelectric conversion thereof;
- a reproduction signal processing unit configured to process the detection signal from said photo detector unit; and
- a controller unit configured to control said laser driver unit and said reproduction signal processing unit,
- wherein said controller unit, when reproducing a test mark recorded within said test area with said write strategy, obtains amplitudes at a front portion, a middle portion and a rear portion of said test mark, and determines whether or not the reproduced test mark has a desirable mark configuration, upon basis of at least one of the following ratios: (1) a ratio between the amplitude of said front portion and the amplitude of said rear portion and (2) a ratio between the amplitude of said middle portion and the amplitude of said rear portion, and when said test mark does not have the desirable make configuration, said controller unit generates a corrected write strategy, whereby recording the information in said data area with said corrected write strategy;
- wherein a recording waveform to be used in recording of said test mark includes a front pulse, a middle pulse, and a rear pulse; and
- wherein said controller unit is configured to perform the following steps:
- changing only pulse width of said front pulse upon basis of a ratio between the amplitude of said front pulse and the amplitude of said rear pulse, when said test mark does not have a desirable mark configuration,
- controlling to reproduce said test mark, after recording a test mark same to said test mark within said test area, with the use of the write strategy, such that only the pulse width of said front pulse is changed; and
- determining whether or not the mark configuration has the predetermined mark configuration, from the reproduction signal of said test mark.

* * * * *